(12) United States Patent
Yamamoto (10) Patent No.: US 7,606,941 B2
(45) Date of Patent: Oct. 20, 2009

(54) FIFO DEVICE

(75) Inventor: Hitoshi Yamamoto, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 617 days.

(21) Appl. No.: 10/282,728

(22) Filed: Oct. 29, 2002

(65) Prior Publication Data

US 2004/0083309 A1 Apr. 29, 2004

(51) Int. Cl.
G06F 15/16 (2006.01)

(52) U.S. Cl. .............. 709/250; 709/230; 709/232; 709/233; 709/234; 709/235

(58) Field of Classification Search ............... 709/230, 709/250, 232–235; 345/418, 421; 395/200.63, 395/200.64, 200.65, 200.62
See application file for complete search history.

(56) References Cited

U.S. PATENT DOCUMENTS

| | | | |
|---|---|---|---|
| 5,291,189 A | | 3/1994 | Otake et al. |
| 5,515,482 A | | 5/1996 | Yamamoto et al. |
| 5,664,078 A | | 9/1997 | Yamamoto et al. |
| 5,710,773 A | * | 1/1998 | Shiga ............... 370/512 |
| 5,752,076 A | * | 5/1998 | Munson ............. 710/5 |
| 5,771,046 A | | 6/1998 | Izawa et al. |
| 5,781,599 A | * | 7/1998 | Shiga ............... 375/376 |
| 5,787,256 A | * | 7/1998 | Marik et al. ......... 709/238 |
| 5,838,922 A | * | 11/1998 | Galand et al. ........ 709/232 |
| 5,895,502 A | | 4/1999 | Yamamoto |
| 5,982,398 A | | 11/1999 | Yamamoto |
| 5,987,126 A | * | 11/1999 | Okuyama et al. ..... 380/203 |
| 5,991,304 A | * | 11/1999 | Abramson ........... 370/413 |
| 6,055,590 A | * | 4/2000 | Pettey et al. ........ 710/56 |
| 6,198,751 B1 | * | 3/2001 | Dorsey et al. ....... 370/466 |
| 6,226,338 B1 | * | 5/2001 | Earnest .............. 375/372 |
| 6,232,986 B1 | | 5/2001 | Yamamoto |
| 6,356,951 B1 | * | 3/2002 | Gentry, Jr. .......... 709/250 |
| 6,732,223 B1 | * | 5/2004 | Johnson ............. 711/105 |
| 6,904,475 B1 | * | 6/2005 | Fairman ............. 710/52 |
| 6,957,270 B1 | * | 10/2005 | Erimli et al. ........ 709/235 |
| 7,020,724 B2 | * | 3/2006 | Emerson et al. ...... 710/22 |
| 2001/0017860 A1 | * | 8/2001 | Hata ................. 370/395 |
| 2002/0176425 A1 | * | 11/2002 | Aoki ................ 370/395.4 |
| 2006/0117119 A1 | * | 6/2006 | Emerson et al. ...... 710/22 |

OTHER PUBLICATIONS

U.S. Appl. No. 10/067,481, of Yamamoto, filed Feb. 5, 2002.

* cited by examiner

*Primary Examiner*—Nathan J Flynn
*Assistant Examiner*—Mohamed Wasel
(74) *Attorney, Agent, or Firm*—Cooper & Dunham, LLP (57) ABSTRACT

A receiving FIFO device can prevent a PCI bus from being occupied unnecessarily to enhance the performance of a whole system. An input control part checks in a third comparing part whether or not a received packet written in a memory part is an error packet on the basis of acknowledge information contained in a trailer part of the received packet. If the received packet is the error packet, the input control part supplies a signal EMPTY being HIGH to an output control device and cancels the received packet, thereby preventing the error packet from being transferred to a receiving DMA device. Furthermore, the input control part checks in a second comparing part whether or not the received packet written in the memory part belongs to a predetermined type of packet on the basis of tcode information contained in the first quadret of a header part of the received packet. Only if the received packet belongs to the predetermined type of packet, the input control part cancels the received packet for a predetermined type of error.

9 Claims, 9 Drawing Sheets

FIFO DEVICE

BACKGROUND OF THE INVENTION

1. Field of the Invention

The present invention generally relates to FIFO (First-In First-Out) devices having a FIFO type memory used in a data transfer control device of a PCI host card with an IEEE 1394 interface based upon an OHCI (Open Host Controller Interface) standard inside a personal computer and so on and, more particularly, to a receiving FIFO device serving to transfer data received from an external device via an IEEE 1394 type bus to the personal computer and so on via a PCI bus.

2. Description of the Related Art

In conventional data transfer control devices inside of a personal computer and so on including a serial bus interface circuit based upon the IEEE 1394, an IEEE 1394 type bus is connected with a physical layer, and the physical layer is connected with a link layer. The link layer is subsequently connected with a sending FIFO device for asynchronous packet, a sending FIFO device for isochronous packet and a receiving FIFO.

The sending FIFO device for asynchronous packet, the sending FIFO device for isochronous packet and the receiving FIFO are connected with a sending DMA (Direct Memory Access) device for asynchronous packet, a sending DMA device for isochronous packet and a receiving DMA, respectively. Then, these DMA devices are connected with a PCI control unit for controlling a PCI bus, thereby connected with a PCI bus via the PCI control unit.

Each of the above-mentioned DMA devices is connected with the PCI bus. However, these DMA devices are not mutually synchronized so that the DMA devices are likely to conflict with each other for the use of the PCI bus. Accordingly, it is highly probable that a personal computer performs poorly under the situation that the personal computer includes a plurality of IEEE 1394 type devices connected mutually. Under the situation, in order to prevent the conflict for the PCI bus as much as possible, it is necessary to avoid occupying the PCI bus for the sake of error data that should be ignored by nature.

Figure 1:
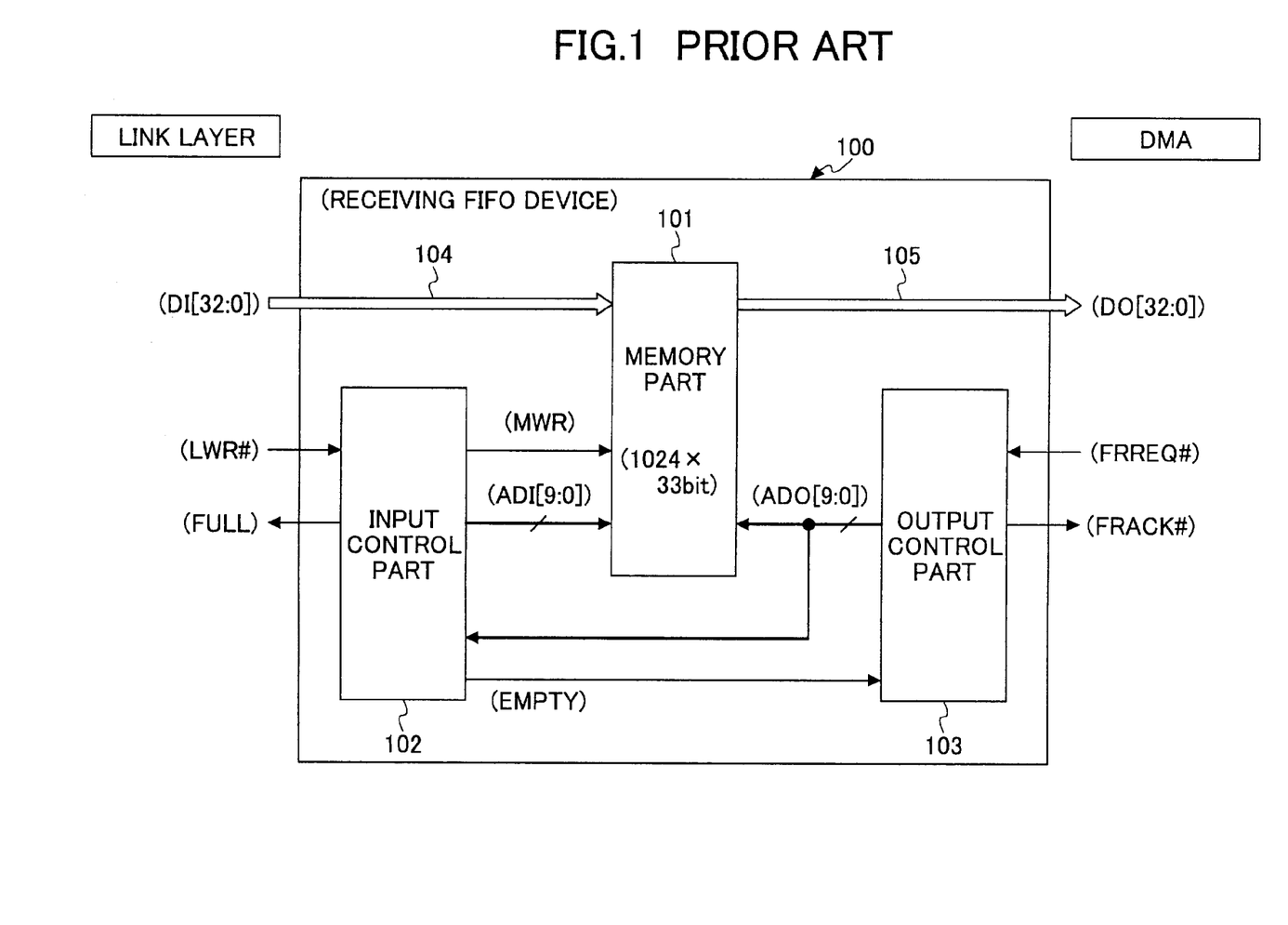
FIG. 1 is a diagram illustrating a structure of a conventional receiving FIFO device.

FIG. 1 is a diagram illustrating a conventional receiving FIFO device. In FIG. 1, a receiving FIFO device 100 comprises a memory part 101, an input control part 102 for controlling a input operation of data, and an output control unit 103 for controlling an output operation of data. The memory part 101 is formed of a memory circuit in which an input packet is actually stored. Under FIG. 1, the memory part 101 possesses memory capacity of 1024×33 bits. The memory part 101 receives an input data DI[32:0] from the link layer via a data input bus 104 and a timing signal MWR from the input control part 102. The timing signal MWR serves to gain timing when the input data DI[32:0] from the input control part 102 is written in the memory part 101.

Also, the memory part 101 receives a write address ADI [9:0] from the input control part 102 and a read address ADO[9:0] from the output control part 103. The write address ADI[9:0] indicates an address in the memory part 101 in which data should be written and possesses memory capacity of 10 bits. The read address ADO[9:0] indicates an address in the memory part 101 from which data should be read and possesses memory capacity of 10 bits. An output data DO[32: 0] from the memory unit 101 is sent to the receiving DMA device, which is not illustrated in FIG. 1, via a data output bus 105.

The input control part 102 receives a timing signal LWR# from the link layer and the read address ADO[9:0] from the output control part 103. The timing signal LWR# serves to gain timing when data should be written. In addition, the input control part 102 supplies to the link layer a FULL signal indicating a FULL state, that is, the memory part 101 has no room to store data. At the same time, the input control part 102 supplies to the output control part 103 an EMPTY signal indicating an EMPTY state, that is, the memory part 101 has some rooms to store data.

The output control part 103 receives a read data request signal FRREQ# from the receiving DMA device, and supplies a read data acknowledge signal FRACK# to the receiving DMA device. Here, the breadth of each data in the memory part 101 possesses memory capacity of 33 bits, because an IEEE 1394 type packet is basically formed of 32 bits and one extra bit, which is added in the link layer, serves to indicate the last data of the packet.

Figure 2:
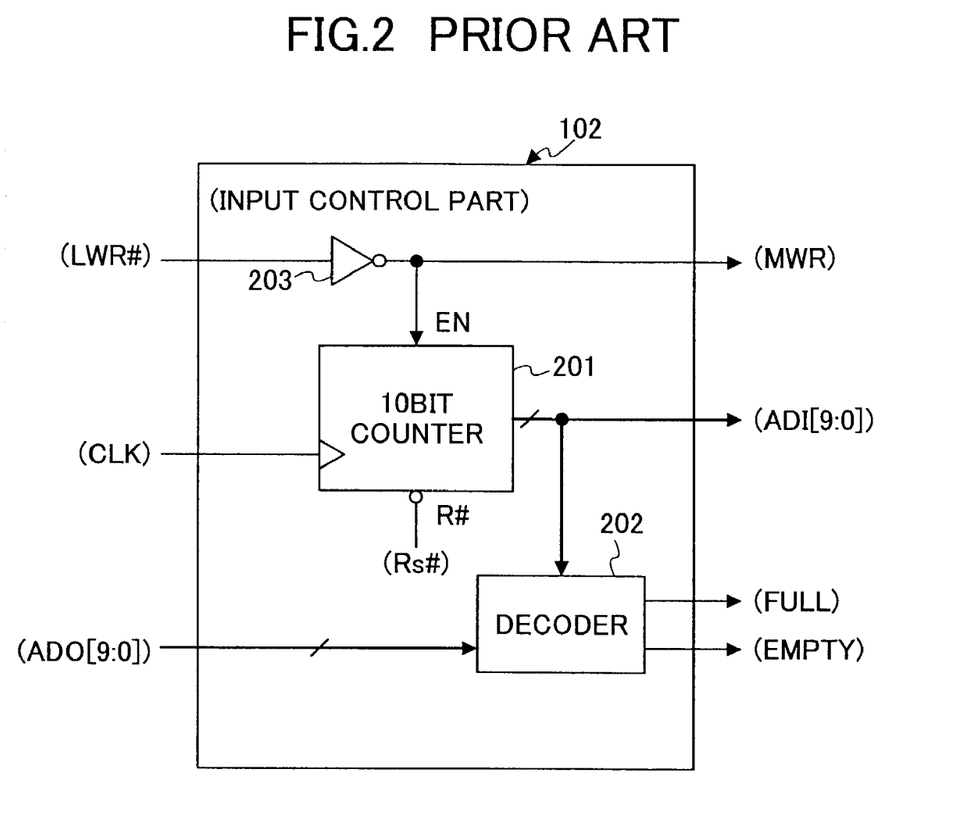
FIG. 2 is a block diagram illustrating a structure of an input control part 102 shown in FIG. 1.

FIG. 2 is a block diagram illustrating a structure of the input control part 102 shown in FIG. 1. In FIG. 2, the timing signal LWR# is inverted to generate a timing signal MWR. The timing signal MWR is supplied to an enable terminal EN of a 10 bit counter 201 serving to control its internal counter. The 10 bit counter 201 sends the write address ADI[9:0] to the memory part 101. Also, the 10 bit counter 201 is set as "000h" at the reset, that is, the time when a reset signal Rs# being LOW is supplied to a reset terminal R#. A decoder 202 decodes the write address ADI[9:0] and the read address ADO[9:0] in a predetermined way to generate and send the FULL signal and the EMPTY signal.

A received IEEE 1394 type data written in the memory part 101 comprise a header part containing a type of packet and address information, a data part containing data information, and a trailer part containing receiving time and acknowledge information sent back to a sender of the received data. Under the header part, the data part and the trailer part, one word is formed of 32 bit data, which is called a quadret hereafter. The trailer part, which is the last quadret of received data, has the acknowledge information including various types of error information.

Under the above-mentioned conventional receiving FIFO device 100, a receiving packet does not prove an error packet to be canceled out of the device until the trailer part, the last portion of the packet, is received. As a result, even if the receiving FIFO device receives the error packet and then the DMA device receives the error packet, the PCI bus is occupied for the sake of the error packet. Accordingly, conventional FIFO devices has the problem that the occupation of the PCI bus for the transferring of the error packet is likely to cause a conflict for the PCI bus among the above-mentioned DMA devices thereby decreasing processing power of the entire system.

SUMMARY OF THE INVENTION

It is a general object of the present invention to provide an improved and useful FIFO device in which the above-mentioned problems are eliminated.

A more specific object of the present invention is to provide a receiving FIFO device that can enhance processing power of an entire system by preventing unnecessary occupation for a PCI bus.

In order to achieve the above-mentioned objects, there is provided according to one aspect of the present invention a FIFO device for temporarily storing and transferring an input IEEE 1394 type packet through an IEEE 1394 type interface, comprising: a memory part storing the input packet; an input control part generating and sending addresses in the memory part in which the data should be written sequentially at a predetermined time interval according to input control signals from the exterior of the part so as to control writing of data into the memory part; and an output control part generating and sending addresses in the memory part from which the data should be read sequentially at a predetermined time interval according to input control signals from the exterior of the part so as to control reading of data from the memory part, wherein the input control part determines by predetermined information on the input packet stored in the memory part whether or not the input packet should be transferred, and if the input control part determines that the input packet should not be transferred, the input control part gives no acknowledgement to read the input packet from the memory part and has the input packet overwritten for a new input packet thereby deleting the input packet stored in the memory part.

According to the above-mentioned invention, the input control part determines whether or not the input packet should be transferred, thereby preventing an unnecessary packet from being transferred. When the FIFO device is working for the transferring an input packet to a PCI bus in a data transfer control device, the FIFO device can prevent unnecessary accesses to the PCI bus, thereby improving the performance of an entire system including the data transfer control device.

Additionally, the above-mentioned input control part may determine by acknowledge information included in a trailer part of the input packet stored in the memory unit whether or not the packet should be transferred.

According to the above-mentioned invention, it can be determined easily whether or not a packet should be transferred.

Additionally, the above-mentioned input control part may give no acknowledgement that the output control part reads data from the memory part until the input part receives the acknowledge information for the input packet stored in the memory part.

According to the above-mentioned invention, the input control part can reliably prevent an error packet from being read by mistake.

Additionally, only if an input packet not only contains an error but also agrees with a predetermined type of packet, the above-mentioned input control part may give no acknowledgement that the output control part reads the data from the memory part and then have the data overwritten for a new input packet.

According to the above-mentioned invention, according to circumstances of use, the input control part is capable of selecting types of packet that should not be transferred and canceled. Namely, the input control part is capable of selecting types of packet that contains an error but may be sent.

Additionally, the above-mentioned input control part may determine by information on a type of packet included in a header part of the packet stored in the memory part whether or not the packet agrees with the predetermined type of packet.

According to the above-mentioned invention, it can be determined easily what type of input packet stored in the memory part is.

Other objects, features and advantages of the present invention will become more apparent from the following detailed description when read in conjunction with the accompanying drawings.

DETAILED DESCRIPTION OF THE PREFERRED EMBODIMENTS

An embodiment of the present invention will now be described with reference to figures.

Figure 3:
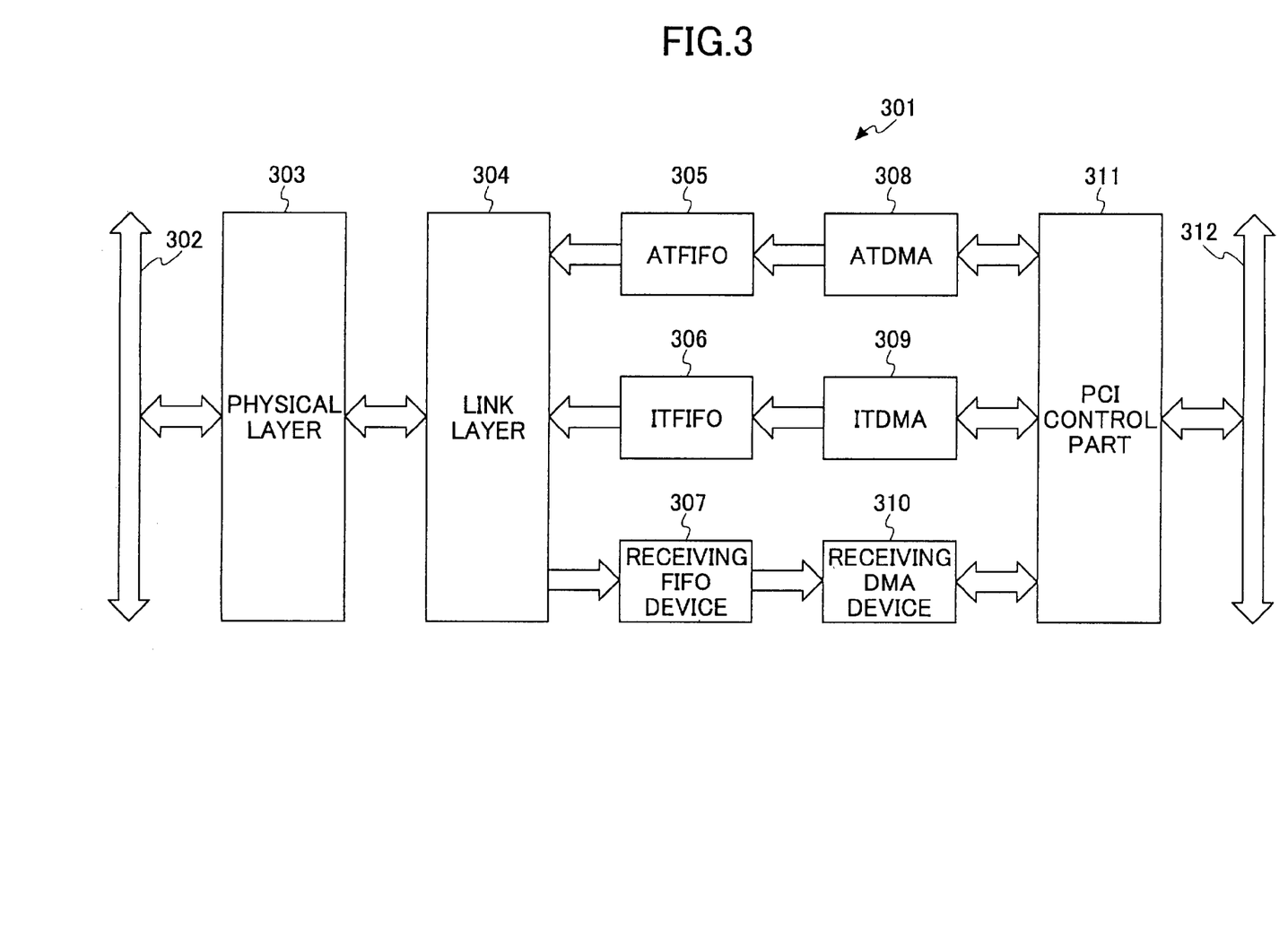
FIG. 3 is a block diagram roughly illustrating a structure of a data transfer control device using a FIFO device according to a first embodiment of the present invention.

FIG. 3 is a block diagram roughly illustrating a structure of a data transfer control device using a FIFO device according to a first embodiment of the present invention. FIG. 3 illustrates a mechanism of data transmission in a personal computer and others based on IEEE 1394.

In a data transfer control device 301 for the personal computer and others having a serial bus interface circuit based upon IEEE 1394, an IEEE 1394 type bus 302 is connected with a physical layer 303, and the physical layer 303 is connected with a link layer 304. Subsequently, the link layer 304 is connected with an asynchronous packet sending FIFO device 305, an isochronous packet sending FIFO device 306, and a receiving FIFO device 307, where these FIFO devices have a memory structure whose input and output access follows the rule of FIFO. In FIG. 3, the asynchronous packet sending FIFO device 305 and the isochronous packet sending FIFO device 306 are represented as an ATFIFO and an ITFIFO, respectively.

Subsequently, the asynchronous-packet sending FIFO device 305, the isochronous packet sending FIFO device 306 and the receiving FIFO device 307 are connected with an asynchronous packet sending DMA device 308 (Direct Memory Access), an isochronous packet sending DMA device 309 and a receiving DMA device 310, respectively. In FIG. 3, the asynchronous packet sending DMA device 308 and the isochronous packet sending DMA device 309 are represented as an ATDMA and an ITDMA, respectively. Subsequently, these DMA devices 308 through 310 are connected with a PCI control part 311 for controlling a PCI bus 312, thereby having connections with the PCI bus 312 through the PCI control part 311.

Figure 4:
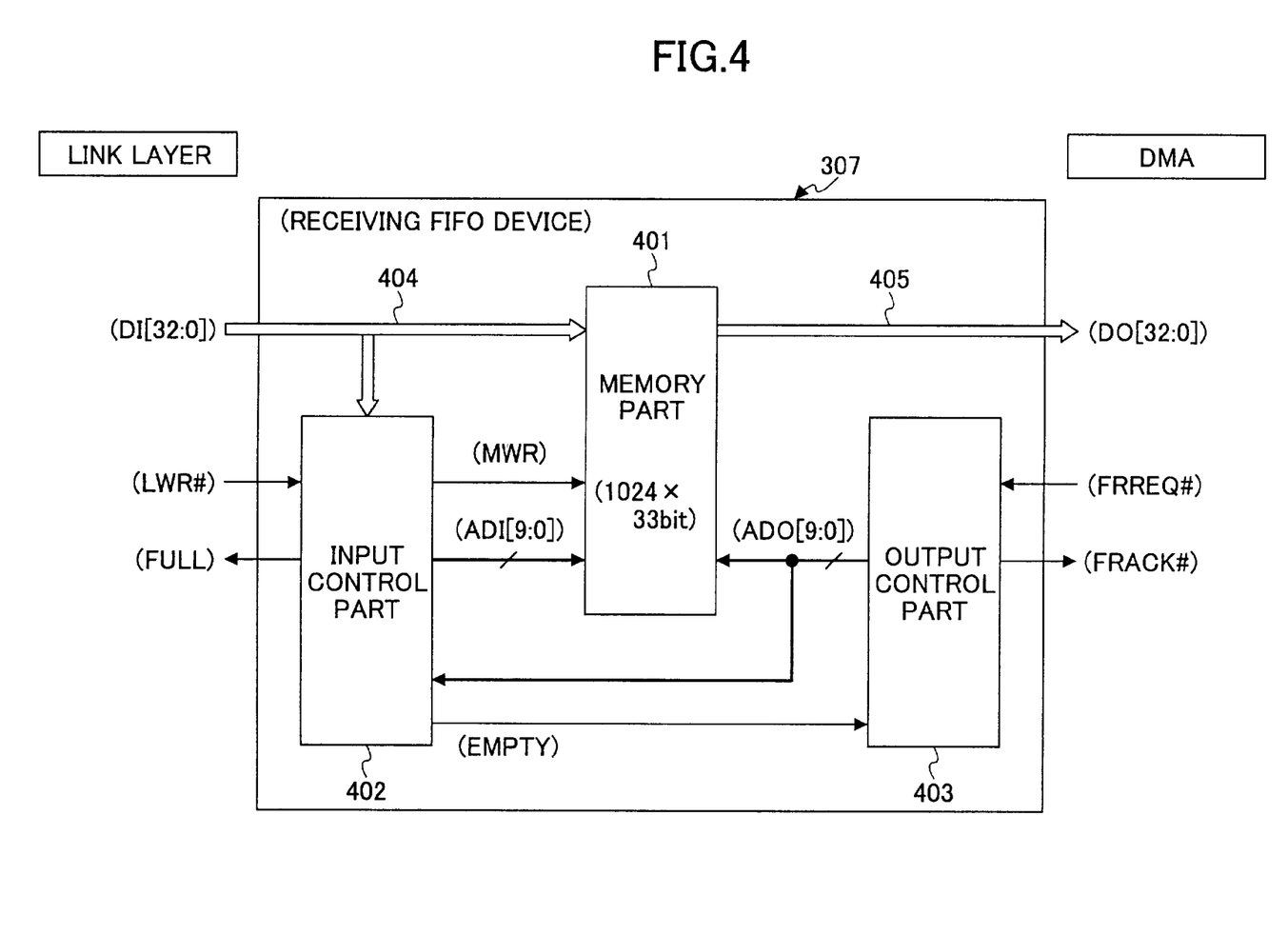
FIG. 4 is a block diagram roughly illustrating a structure of the FIFO device according to the first embodiment of the present invention.

FIG. 4 is a block diagram roughly illustrating a structure of the FIFO device according to the first embodiment of the present invention. FIG. 4 illustrates the receiving FIFO device 307 shown in FIG. 3.

The receiving FIFO device 307 in FIG. 4 comprises a memory part 401, an input control part 402 for controlling writing of data to the memory part 401, and an output control part 403 for controlling reading of data from the memory part 401. The memory part 401 is formed of a memory circuit storing an input packet. In FIG. 4, the memory part 401 has memory capacity of 1024×33 bits.

The memory part 401 receives input data DI[32:0] from the link layer 304 via a data input bus 404 and a timing signal MWR signal for writing the input data DI[32:0] from the input control part 402. Additionally, the input control part 402 receives a portion of the input data DI[32:0] from the data input bus 404. From the input control part 402, the memory part 401 receives a write address ADI[9:0] formed of 10 bits designating an address in which data should be written. From the output control part 403, the memory part 401 receives a read address ADO[9:0] formed of 10 bits designating an address from which data should be read. Output data DO[32:0] from the memory part 401 is sent to the receiving DMA device 310 via a data output bus 405.

It should be noted that a notation [32:0] of the input data DI[32:0] and the output data DO[32:0] means that these data are formed of 33 bits from the 32nd bit to 0th bit. Similarly, a notation [9:0] of the write address ADI[9:0] and the read address ADO[9:0] means that these address are formed of 10 bits from 9th bit to 0th bit.

The input control part 402 receives a timing signal LWR# from the link layer 304 and a read address ADO[9:0] from the output control part 403. Furthermore, the input control part 402 sends to the link layer 304 a signal FULL indicating that the memory part 401 has no additional space to store data and at the same time sends to the output control part 403 a signal EMPTY indicating that the memory part 401 has some spaces to store data.

The output control part 403 receives a read data request signal FRREQ# from the receiving DMA device 310 for reading of data from the memory part 401, and sends a read data accept signal FRACK to the receiving DMA device 310 according to an empty state of the memory part 401. Here, capacity of 33 bits is prepared for the memory part 401 due to the fact that a packet based upon IEEE 1394 is basically formed of 32 bit data and one more bit is added in the link layer 304 to indicate the last data of the packet.

Figure 5:
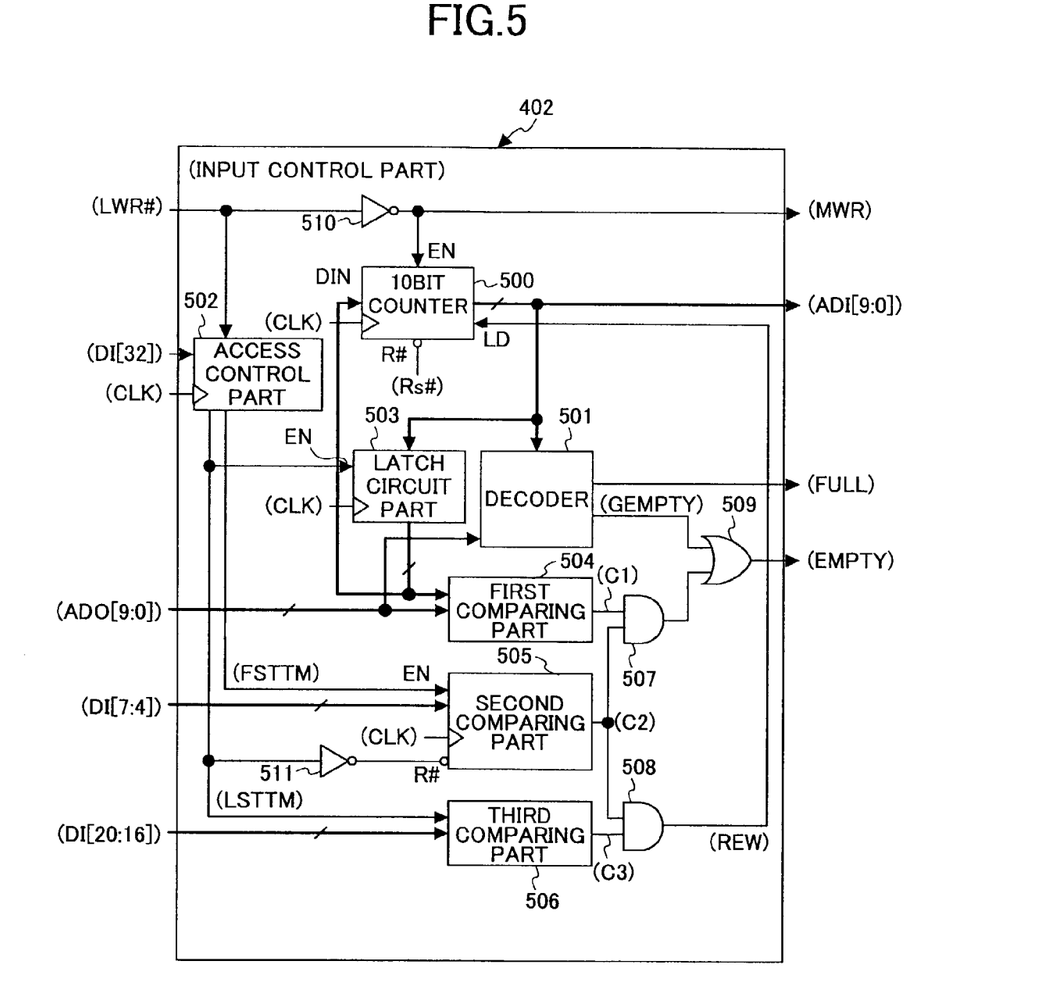
FIG. 5 is a block diagram illustrating a structure of an input control part 402 shown in FIG. 4.

FIG. 5 is a block diagram illustrating a structure of the input control part 402 in FIG. 4.

In FIG. 5, the input control part 402 comprises a 10 bit counter 500, a decoder 501, an access control part 502, a latch circuit part 503, a first comparing part 504, a second comparing part 505, a third comparing part 506, AND circuits 507 and 508, an OR circuit 509, and inverters 510 and 511. The signal LWR# from the link layer 304 is inverted by the inverter 510. The inverted signal is sent to the memory part 401 as the signal MWR. The MWR signal is also sent to an enable terminal EN of the 10 bit counter 500 for counting up. When the MWR signal becomes HIGH, the 10 bit counter 500 becomes enable and begins to count up.

The 10 bit counter 500 sends the write address ADI[9:0] to the memory part 401 together with the decoder 501 and the latch circuit 503. At the reset when the 10 bit counter 500 receives a reset signal Rs# being LOW on a reset terminal R#, a counter value of the 10 bit counter 500 is reset as "000h". Also, when the 10 bit counter 500 receives a signal being HIGH on a data load terminal LD, 10 bit data sent to a data input terminal DIN is loaded as a counter value.

The decoder 501 decodes the input write address ADI[9:0] and the input read address ADO[9:0] in a predetermined way thereby generating the signals FULL and EMPTY. Then, the decoder 501 sends the generated signal FULL to the link layer 304 and the generated signal EMPTY to one input terminal of the OR circuit 509. As it will be mentioned later, the signal EMPTY from the decoder 501 is called a signal GEMPTY hereafter, because an output signal from the OR circuit 509 is sent to the output control part 403 as the signal EMPTY.

The access control part 502 generates signals FSTTM and LSTTM based on the signal LWR# and input data DI[32] that is formed of the 32nd bit of the input data DI[32:0]. The signal FSTTM indicates that input data from the link layer 304 is the first data of the packet concerned. The LSTTM signal indicates that input data from the link layer 304 is the last data of the packet concerned. Additionally, the access control part 502 sends the generated signal FSTTM to enable terminals of the latch circuit 503 and the second comparing part 505, and the generated signal LSTTM to an input terminal of the inverter 511 and the third comparing part 506. The signal LSTTM is sent to the reset terminal R# through the inverter 511.

Figure 6:
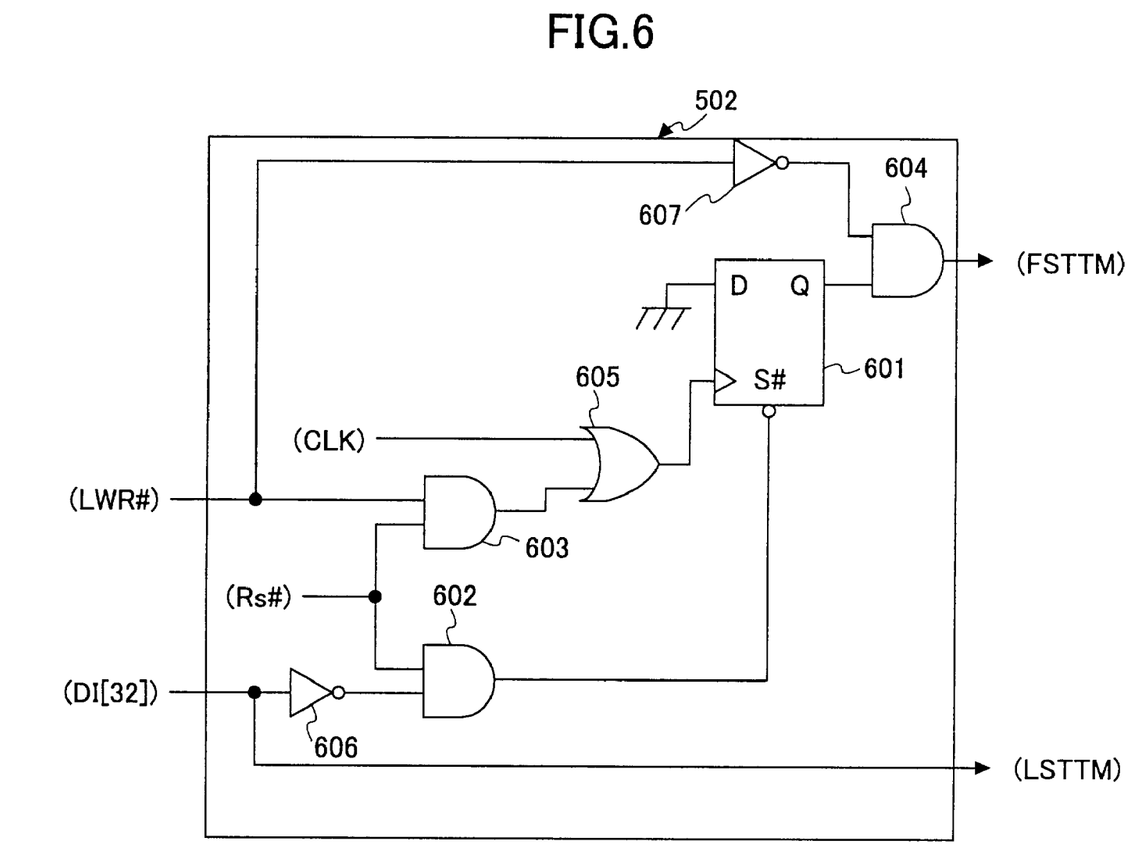
FIG. 6 is a circuit diagram illustrating an internal structure of an access control part 502 shown in FIG. 5.

FIG. 6 is a circuit diagram illustrating an internal structure of the access control part 502. In FIG. 6, the access control part 502 comprises a D flip-flop 601, AND circuits 602 through 604, an OR circuit 605 and inverters 606 and 607. The input data DI[32] is sent to one terminal of the AND circuit 602 through the inverter 606 and produces the signal LSTTM.

The signal LWR# is sent to one terminal of the AND circuit 603 and one terminal of the AND circuit 604 through the inverter 607. On the other hand, the other terminals of the AND circuits 602 and 603 receive the reset signal Rs# from the exterior. Here, the reset signal Rs# is supplied via the PCI bus 312 when a system having the data transfer control device 301 such as a personal computer is powered or reset. In FIG. 6, a signal path from which the reset signal Rs# comes is omitted.

An output signal from the AND circuit 602 is sent to a synchronous set terminal S# of the D flip-flop 601, and an output signal from the AND circuit 603 is sent to one terminal of the OR circuit 605. The other terminal of the OR circuit 605 receives a system clock CLK from the exterior. Here, the system clock CLK is a clock signal used for the system having the data transfer control device 301 such as a personal computer. In FIG. 6, a signal path from which the system clock CLK comes is omitted.

An output signal from the OR circuit 605 is sent to a clock signal input terminal of the D flip-flop 601 and serves as a clock signal for the D flip-flop 601. An output signal from a noninverted output terminal Q of the D flip-flop 601 is sent to the other terminal of the AND circuit 604. An output signal from the AND circuit 604 becomes the signal FSTTM. The D flip-flop 601 performs latch operation at an up-edge of a signal supplied to a clock signal input terminal, because a D input terminal of the D flip-flop 601 is grounded. Under the above-mentioned configuration, if the signal LWR# becomes LOW for the input data DI[32] being LOW, the access control part 502 supplies the signal FSTTM being HIGH over one clock and the input data DI[32] as the signal LSTTM.

The latch circuit part 503 receives the write address ADI[9:0] from the 10 bit counter 500. When the signal FSTTM in the enable terminal EN becomes enable, that is, a signal being HIGH is sent to the enable terminal EN, the latch circuit part 503 latches the write address ADI[9:0], which means that the latch circuit part 503 latches an address in the memory part 401 in which the first data of a packet should be written.

The first comparing part 504 compares the latched address in the latch circuit part 503 with the read address ADO[9:0] from the output control part 403. If the two have the same address, the first comparing part 504 supplies a signal C1 being HIGH. If not, the first comparing part 504 supplies a signal C1 being LOW. Accordingly, when the output signal C1 is HIGH, the receiving DMA device 310 attempts to read the packet concerned that the link layer 304 is writing into the receiving FIFO device 307.

The second comparing part 505 receives input data DI[7:4] formed of 4 bits from 7th bit to 4th bit of the input data DI[32:0] and the signal FSTTM from the access control part 502 through the enable terminal EN. The second comparing part 505 compares the input data DI[7:4] with predetermined data. When receiving the signal FSTTM being HIGH, the second comparing part 505 latches and outputs a result of the comparison.

A description will now be given, with reference to FIG. 7, of a format of receiving IEEE 1394 type data.

Figure 7:
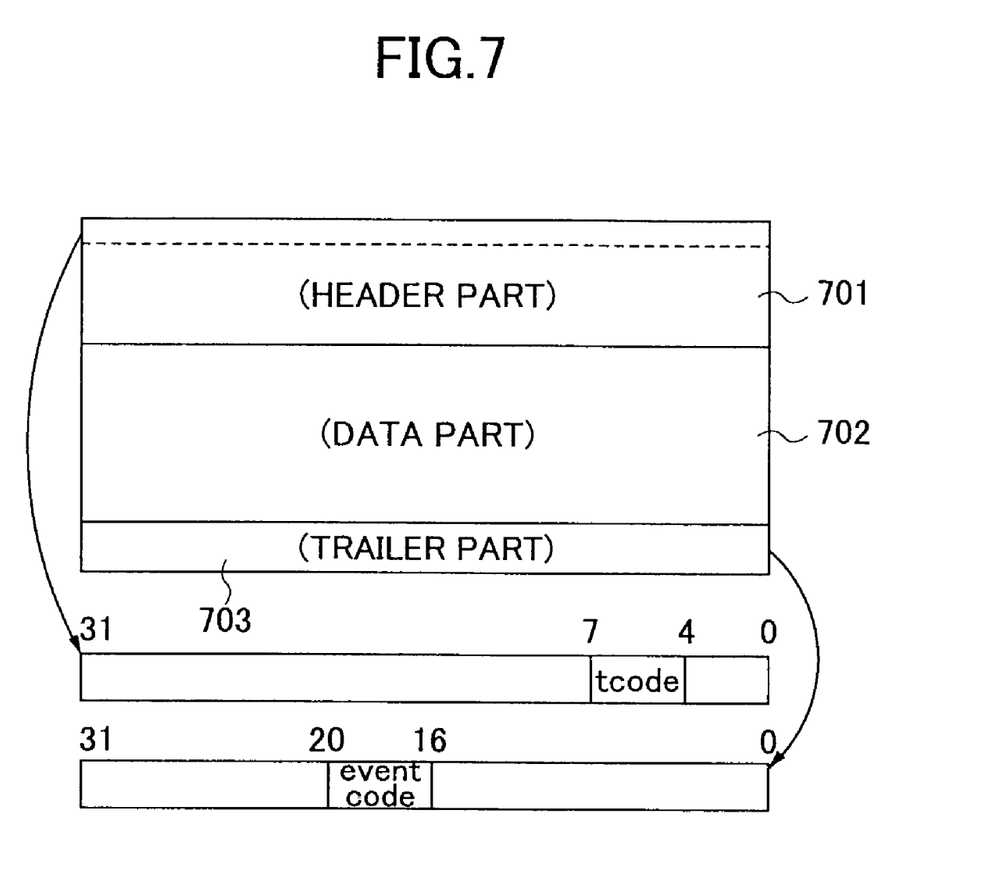
FIG. 7 is a diagram roughly illustrating a format of an input packet from a link layer 304 shown in FIG. 3.

FIG. 7 is a diagram roughly illustrating a format of a packet input from the link layer 304. It should be noted that the input data DI[32] formed of one bit is omitted in FIG. 7. From the input data DI[32] that is added in the link layer 304, it can be determined whether or not the input data DI[32:0] is the last portion of the packet concerned.

As shown in FIG. 7, the input packet from the link layer 304 comprises a header part 701 containing a type of the packet and address information and the like, a data part 702 containing data information, and a trailer part 703 containing receiving time and acknowledge information sent back to a sender. The header part 701, the data part 702 and the trailer part 703 are formed of pieces of 32 bit word data, that is, pieces of input data DI[31:0]. The 32 bit word data is called a quadret hereafter.

The header part 701 is formed of at most 4 quadrets. Bits from 7th to 4th of a first quadret in the header part 701 contains information on a type of the packet concerned, which is called a "tcode". The data part 702 is formed of 0 through 1024 quadrets. Some packets have no quadret in the data part 702. The last quadret of the input packet is called the trailer part 703. Bit from 20th to 16th of the trailer part 703 contains acknowledge information sent back to a sender of the packet concerned, which is called an "event code".

The acknowledge information includes a variety of information items such as "ack_complete" indicating that the data transfer control device 301 has successfully received data and "ack_pending" indicating that the data transfer control device 301 has successfully received data but is going to send a response packet afterward. Furthermore, the acknowledge information includes "ack_busy" indicating that the data transfer control device 301 cannot currently receive data for some reasons and "ack_data_error" indicating that the data transfer control device 301 has received data including some errors.

When receiving a first quadret of the header part 701 of a packet from the link layer 304 and the signal LSTTM being HIGH from the access control part 502, the second comparing part 505 checks whether or not the input data DI[7:4] formed of tcode information is equivalent to predetermined data. Then, the second comparing part 505 latches and outputs the result as an output signal C2.

For example, if the input data DI[7:4] is equivalent to the predetermined data, the second comparing part 505 generates the signal C2 being HIGH. On the other hand, if the signal LSTTM from the access control part 502 is HIGH and the second comparing part becomes active, the second comparing part generates the signal C2 being LOW because the reset terminal R# becomes LOW through the inverter 511 and the second comparing part 502 is reset in sync with the clock signal CLK.

The need to cancel predetermined types of packet in an error state by using tcode information will now be explained Under IEEE 1394, there are mainly two types of packet: an asynchronous packet and an isochronous packet. Moreover, the asynchronous packet has two types of packet: an asynchronous request packet and an asynchronous response packet. Normally, the data transfer control device 301 receives the asynchronous request packet from IEEE 1394 type bus 302 and directly transfers the asynchronous request packet to a main memory, which is not illustrated in FIG. 3, via the PCI bus 312.

When a CPU, which is not illustrated in FIG. 3, executes predetermined software, the transferred packet is processed to generate the asynchronous response packet. The data transfer control device 301 sends the asynchronous response packet from the main memory to the IEEE type 1394 bus 302 via the PCI bus 312. Moreover, the asynchronous packet has special types of packet: a physical request and a physical response. The physical request packet is the asynchronous packet such that address information on a receiver of the packet is formed of a type of the "tcode" based upon IEEE 1394 and the address is appointed in a physical domain.

The data transfer control device 301 automatically generates a physical response packet for the above-mentioned physical request packet with no use of software, and sends the generated packet to the IEEE 1394 type bus 302. The use of the physical request packet brings an advantage of less process time required from receiving a request packet to sending a response packet than the use of software. However, in the case that the data transfer control device cancels data in an error state for all types of packet, there is a higher probability that the data transfer control device 301 stops temporally receiving any packet. In the case, the risk can be carried that a process for receiving the physical request packet is delayed.

Also, acknowledge information pertaining to an error is not normally issued when the physical request packet is received, because only the data transfer control device 301 involves in generating the physical response packet. If the data transfer control device 301 can choose data to be canceled with the use of "tcode" indicating a type of packet, it is possible to prevent a delay of process for the physical request packet. Although the data transfer control device 301 uses only tcode information under the embodiment of the present invention, the data transfer control device 301 additionally may use a circuit for determining the physical domain. However, in order to use an address for determining the physical domain, a decoder for 48 bit data is required thereby complicating the circuit. Thus, only tcode information is used under the embodiment of the present invention.

The third comparing part 506 receives an input data DI[20:16] formed of 5 bits from 20th bit to 16th bit of the input data DI[32:0], and the signal FSTTM from the access control part 502. When receiving the signal FSTTM being HIGH from the access part 502, the third comparing part 506 checks whether or not the input data DI[20:16] is equivalent to acknowledge information that is considered as an error. If so, the third comparing part 506 outputs a signal C3 being HIGH while the LSTTM signal is HIGH.

The output signal C1 from the first comparing part 504 is sent to one input terminal of an AND circuit 507. The output signal C2 from the second comparing part 505 is sent to the other input terminal of the AND circuit 507 and one terminal of an AND circuit 508. The output signal C3 from the third comparing part 506 is sent to the other terminal of the AND circuit 508. An output signal of the AND circuit 507 is sent to the other terminal of the OR circuit 509, and subsequently an output signal of the OR circuit 509 is sent to the output control part 403 as the signal EMPTY.

On the other hand, an output signal of the AND circuit 508 is supplied to a load terminal LD of the 10 bit counter 500 as a signal REW. The fact that the signal REW becomes active, that is, the REW signal becomes HIGH exhibits that a type of the packet concerned is predetermined as a type of packet to be canceled if the packet contains an error. The 10 bit counter 500 loads from the latch circuit part 503 address data maintained in the data input terminal DIN to substitute the counter value for the first address of the packet with an error.

Figure 8:
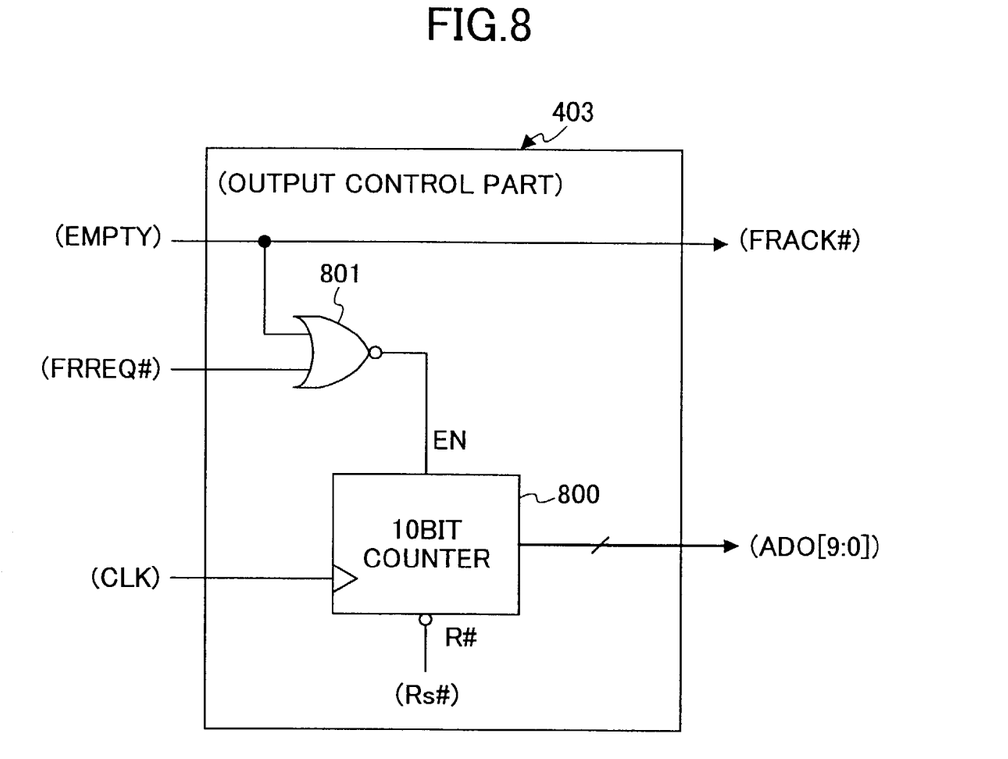
FIG. 8 is a diagram illustrating a structure of an output control part 403 shown in FIG. 4.

FIG. 8 is a diagram illustrating a structure of the output control part 403 shown in FIG. 4. In FIG. 8-, the output control part 403 comprises a 10 bit counter 800 and a NOR circuit 801. The signal EMPTY from the input control part 402 is supplied to one input terminal of the NOR circuit 801 and the receiving DMA device 310 as a read data acknowledge signal FRACK#.

On the other hand, the other input terminal of the NOR circuit 801 receives the read data request signal FRREQ#, and an output signal of the NOR circuit 801 is supplied to an enable terminal EN of the 10 bit counter 800. When a signal being HIGH is supplied to the enable terminal EN, the 10 bit counter 800 becomes enable and starts counting. An output data of the 10 bit counter 800 is sent to the memory part 401 and the input control part 402 as a read address ADO[9:0]. At the reset when the reset signal Rs# being LOW is sent to the reset terminal R#, a counter value is reset as "000h".

Figure 9:
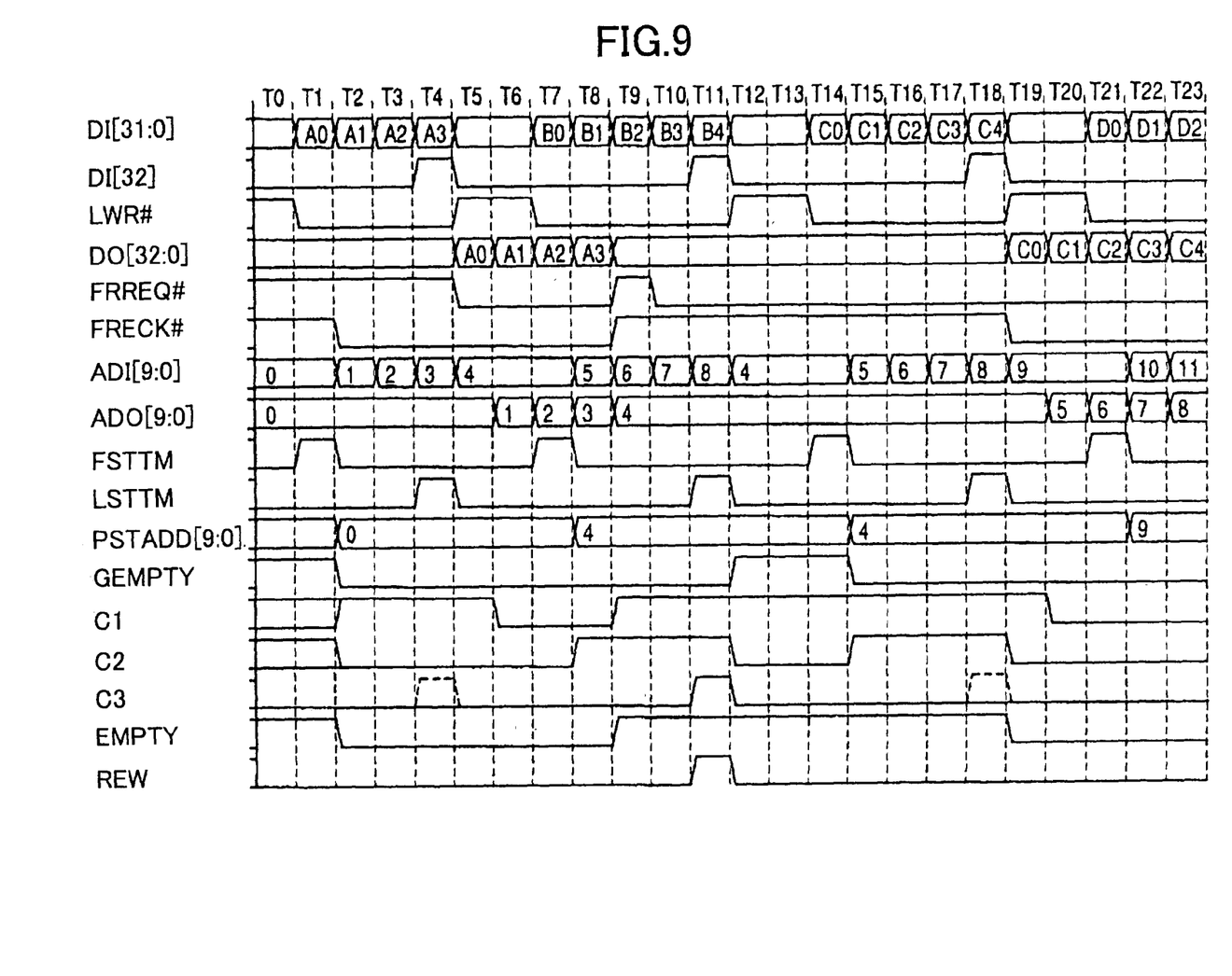
FIG. 9 is a timing chart illustrating timing of signals shown in FIG. 4 and FIG. 5.

FIG. 9 is a timing chart illustrating an example of a signal timing pertaining to each signal in FIG. 4 and FIG. 5 under heretofore mentioned configuration. A description will now be given, with reference to FIG. 9, of each part's action of the input control part 402.

FIG. 9 illustrates the situation that the following packets are sent from the link layer 304: a packet A over timings T1 through T4, a packet B over timings T7 through T11, a packet C over timings T14 through T18 and a packet D over timings T21 through T23. The packet A comprises four pieces of input data A0 through A3 each of which is formed of 32 bit. The packet B comprises four pieces of input data B0 through B3 each of which is formed of 32 bit. The packet C comprises four pieces of input data C0 through C3 each of which is formed of 32 bit. The packet D comprises three pieces of input data D0 through D2 each of which is formed of 32 bit. Also, it is assumed that the packets B and C should be canceled. In this situation, the packet B is canceled due to occurrence of an error in FIG. 9.

Under FIG. 9, the receiving DMA device 310 begins to read data with the timing T5. After reading the packet A until the timing T8, the receiving DMA device 310 subsequently attempts to read the packet B with the timing T10. However, all data of the packet B stored in the memory part 401 are canceled for the following reasons; The first reason is that the packet B belongs to a predetermined collection of packets to be canceled if the packet contains an error. The second reason is that acknowledge information of the packet B represents that the packet B contains an error. Under this situation, additionally, the receiving DMA device 310 is forced to stop reading data until the timing T19, because the packet C also belongs to the predetermined collection of packets to be canceled like the packet B.

Over the timings T1 through T4, the packet A is being written in the memory part 401 of the receiving FIFO device 307. Accordingly, the signal FSTTM becomes HIGH at the timing T1, and the signal LSTTM becomes HIGH at the timing T4. The write address ADI[9:0] is set as "0" at the timing T1 and then is incremented as "1" at the timing T2 and so on until the write address ADI[9:0] is incremented as "4" at the timing T5. The latch circuit part 503 latches at the timing T2 the write address ADI[9:0] designating the start address "0" in which the first data of the packet A should be written. The latch circuit part 503 does not release the write address ADI[9:0] as address data PSTADD[9:0] until the first data of the next packet is written.

The output signal C1 becomes HIGH at the timing T2 and LOW at the timing T6. The output signal C2 becomes LOW at the timing T2. The signal GEMPTY from the decoder 501 becomes LOW at the timing T2 because the memory part 401 is not in an empty state from the timing T2. At this time, the output signal C2 is LOW regardless of a signal level of the output signal C1. Accordingly, the GEMPTY signal from the decoder 501 is supplied from the OR circuit 509 as the signal EMPTY, and the read acknowledge signal FRACK# becomes LOW from the timing T2.

The read request signal FRREQ# from the receiving DMA device 310 becomes LOW from the timing T5. As a result, the 10 bit counter 500 sets the read address ADO[9:0] as "0" at the timing T5 and then counts up the read address ADO[9:0] as "1" at the timing T6 and so on until the read address ADO[9:0] is set as "4" at the timing T9.

The input control part 402 attempts to write the packet B from the link layer 304 in the memory part 401 over the timings T7 through T11. However, the output signal C2 becomes HIGH over the timings T8 through T11 because the packet B should be canceled. The latch circuit part 503 loads and latches at the timing T8 the write address ADI[9:0] designating the address "4" in which the first data of the packet B should be written. Then, the latch circuit 503 does not release the latched write address ADI[9:0] as address data PSTYADD[9:0] until the first data of the next packet is written.

At the timing T9, the read address ADO[9:0] has "4" like the address data PSTADD[9:0] latched in the latch circuit 503 and the output signal C1 becomes HIGH so that the receiving DMA device 310 can read data from the memory part 401. Both of the output signals C1 and C2 become HIGH from the timing T9, and the EMPTY signal from the OR circuit 509 becomes HIGH from the timing T9. Accordingly, the read acknowledge signal FRACK# to the receiving DMA device 310 becomes HIGH, and it is not allowed to read data from the memory part 401.

On the other hand, when the last data "B4" of the packet B is written in the memory part 401, it is proved that acknowledge information of the packet B includes an error. The output signal C3 becomes HIGH at the timing T11 and the output signal C2 is HIGH, whereby the REW signal becomes HIGH at the timing T11. As a result, the 10 bit counter 500 receives the latched address data PSTADD[9:0] from the latch circuit 503 at the timing T11, whereby the write address ADI[9:0] has "4" like the address data PSTADD[9:0] that is loaded in the 10 bit counter 500.

Accordingly, the error packet B maintained in the memory part 401 is overwritten and deleted because the next packet is written in the addresses followed by the address "4". The write address ADI[9:0] is changed back into the same address "4" as the read address ADO[9:0]. As a result, the memory part 401 becomes an empty state and the signal GEMPTY from the decoder 501 becomes HIGH from the timing T12.

The input control part 402 attempts to write the packet C in the memory part 401 between the timings T14 and T18. However, the same actions as the packet B are performed because the packet C should be canceled like the packet B. The actions for the two packets differs in that the packet C is not overwritten and deleted because an error does not occur in the packet C and the REW signal does not become HIGH at the timing 18. The packet C is written in the memory part 401, whereby the GEMPTY signal from the decoder 501 becomes LOW from the timing T15. However, the output signal C2 becomes HIGH and the EMPTY signal becomes HIGH, whereby continuously stopping reading of data to the receiving DMA device 310.

At the timing T19, the EMPTY signal from the OR circuit 509 becomes LOW and the read acknowledge signal FRACK# to the receiving DMA device 310 becomes LOW, because the output signal C2 becomes LOW. As a result, the receiving DMA device starts to read from the memory part 401 data of the packet C that has not been deleted.

In the FIFO device according to the embodiment of the present invention, the input control part 402 checks in the third comparing part 506 whether or not an input packet written in the memory part 401 from the link layer 304 has an error based on acknowledge information contained in the trailer part of the input packet. If the input packet has some errors, the FIFO device supplies the signal EMPTY being HIGH to the output control part 403 and cancels the input packet, whereby avoiding the unnecessary transferring of the error packet to the receiving DMA device 310.

Also, the input control part 402 compares in the first comparing part 504 the read address ADO[9:0] from the output control part 403 with the write address ADI[9:0] containing the first data of the input packet maintained in the latch circuit 503. Then, the input control part 402 checks whether or not the receiving DMA device 310 attempts to read the packet that is currently being received, that is, the packet that is currently being written in the memory part 401. If the receiving DMA attempts to read the packet, the first comparing part 504 supplies the signal EMPTY being HIGH to the output control part 403 until the trailer part 803, which is the last data of the packet, is written in the memory part 401 because of the possibility that the packet may be eventually canceled. As a result, the FIFO device enables the receiving DMA device 310 to stop temporally reading data from the memory part 401.

In this manner, the FIFO device according to the present invention can prevent unnecessary accesses to the PCI bus and enhance processing power of an entire system including the data transfer control device. Also, the FIFO device can accomplish the decreasing consumption of electric power because the receiving DMA device has no action for unnecessary data processing.

Furthermore, the FIFO device is capable of checking on the basis of the tcode information, which is the first quadret of the header part 801 of an input packet written in the memory part 401 from the link layer 304, whether or not the input packet belongs to a predetermined collection of packets. Only if the input packet belongs to the predetermined collection, the FIFO device can cancel the received packet.

For example, a packet containing a large scale of the data part occupies a PCI bus considerably. On the other hand, a packet containing just the header part carries out little occupation of the PCI bus because the packet containing just the header part is formed of at most four quadrets. If the FIFO device cancel all types of error packet, processing of the receiving DMA device may be delayed because of frequency of the temporary suspend. As mentioned above, there may be some types of error packet such that it is desirable to avoid the delay due to the error packet rather than to occupy the PCI bus. Under this situation, the FIFO device performs better because the FIFO device can determine what type of packet should be canceled on the basis of the tcode information. For example, the FIFO device can stop temporally reading only a packet containing the data part occupying the PCI bus considerably.

In the above-mentioned description, if the symbol "#" is attached to a signal, the signal becomes active for the signal being LOW. If the symbol "#" is not attached to a signal, the signal becomes active for the signal being HIGH. If the symbol "#" is attached to a terminal, the terminal becomes active for the terminal being LOW. If the symbol "#" is not attached to a terminal, the terminal becomes active for the terminal being HIGH.

The present invention is not limited to the specifically disclosed embodiments, and variations and modifications may be made without departing from the scope of the present invention.

What is claimed is:

1. A FIFO device for temporarily storing and transferring an input IEEE 1394 type packet through an IEEE 1394 type interface, said FIFO device comprising:
   a memory part configured to store said input packet;
   an input control part configured to control writing of write data to said memory part sequentially at a predetermined time interval according to input control signals from external to said input control part; and
   an output control part configured to control reading of stored data from said memory part sequentially at a predetermined time interval according to input control signals from external to said output control part,
   wherein said input control part determines, based on acknowledge information in a trailer part of said input packet stored in said memory part, whether or not said input packet should be transferred, and
   wherein when said input control part determines that said input packet should not be transferred, said input control part does not acknowledge a request from external to said input control part to read said input packet from said memory part, and allows said input packet to be overwritten by a new input packet, thereby deleting said input packet from said memory part.

2. The FIFO device of claim 1, wherein said input control part does not allow said output control part to read said input packet stored in said memory part until the input control part receives said acknowledge information for said input packet stored in said memory part.

3. The FIFO device of claim 1, wherein said input control part does not allow said output control part to read said input packet stored in said memory part and allows said input packet to be overwritten by a new input packet, if said input packet contains an error and is equivalent to a predetermined type of packet.

4. The FIFO device of claim 3, wherein said input control part determines based on packet type information included in a header part of said input packet stored in said memory part, whether or not said input packet is equivalent to said predetermined type of packet.

5. The FIFO device of claim 1, wherein said input control part determines based on packet type information in a header part of said input packet, whether said input packet belongs to a predetermined collection of packets to be canceled if the packet contains an error based on said acknowledge information, and when said input control part determines that said input packet belongs to said predetermined collection of packets to be canceled when the packet contains the error, said input control part does not acknowledge the request from external to said input control part to read said input packet from said memory part, and causes said input packet to be overwritten by the new input packet, thereby allowing said input packet to be deleted from said memory part.

6. The FIFO device of claim 1, wherein the acknowledge information includes at least one of first information indicating that data has been successfully received, second information indicating that the data has been successfully received and a response packet is going to be sent, third information indicating that data cannot be currently received and fourth information indicating that the received data includes errors.

7. The FIFO device of claim 1, wherein when the acknowledge information indicates that received data includes errors, said input control part determines that said input packet should not be transferred, and said input control part does not acknowledge the request from external to said input control part to read said input packet from said memory part.

8. The FIFO device of claim 6, wherein said input control part determines based on said packet type information in the header part of said input packet, whether said input packet belongs to a predetermined collection of packets to be canceled if the packet contains an error based on said acknowledge information, and when said input control part determines that said input packet belongs to said predetermined collection of packets to be canceled when the packet contains the error, said input control part does not acknowledge the request from external to said input control part to read said input packet from said memory part, and causes said input packet to be overwritten by the new input packet, thereby allowing said input packet to be deleted from said memory part.

9. A FIFO device for temporarily storing and transferring an input IEEE 1394 type packet through an IEEE 1394 type interface, said FIFO device comprising:

a memory part configured to store an input packet;

an input control part configured to generate write addresses in said memory part, for writing write data sequentially at a predetermined time interval according to input control signals from external to said input control part, and thereby control writing of the write data into said memory part; and an output control part configured to generate read addresses in said memory part, for reading stored data sequentially at a predetermined time interval according to input control signals from external to said output control part, and thereby control reading of the stored data from said memory part, wherein said input control part determines whether or not said input packet should be transferred from said memory part in accordance with (i) acknowledge information in a trailer part of said input packet, and (ii) packet type information in a header part of said input packet, and when said input control part determines that said input packet should not be transferred from said memory part, said input control part does not acknowledge a request from external to said input control part to read said input packet from said memory part, and causes said input packet to be overwritten by a new input packet, thereby allowing said input packet to be deleted from said memory part.

* * * * *